US012447591B1

(12) United States Patent
Cottrell et al.

(10) Patent No.: US 12,447,591 B1
(45) Date of Patent: *Oct. 21, 2025

(54) TORQUE DRIVER

(71) Applicant: AOB Products Company, Columbia, MO (US)

(72) Inventors: Michael Cottrell, Ashland, MO (US); Michael Lindsay, Columbia, MO (US); Paul Coryell, Columbia, MO (US); James Tayon, Moberly, MO (US); Justin Burke, Columbia, MO (US)

(73) Assignee: AOB Products Company, Columbia, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 19/238,216

(22) Filed: Jun. 13, 2025

Related U.S. Application Data

(63) Continuation of application No. 19/175,256, filed on Apr. 10, 2025, which is a continuation of application (Continued)

(51) Int. Cl.
*B25B 23/14* (2006.01)

(52) U.S. Cl.
CPC .................................. *B25B 23/141* (2013.01)

(58) Field of Classification Search
CPC ..... B25B 23/14; B25B 23/141; B25B 23/142; B25B 23/1422; B25B 23/1427
See application file for complete search history.

(56) References Cited

U.S. PATENT DOCUMENTS 2,527,517 A * 10/1950 Barker .................. B25B 23/141 464/44
3,662,628 A * 5/1972 Schnepel .............. B25B 23/141 464/36

(Continued)

FOREIGN PATENT DOCUMENTS

CN 2627272 Y 7/2004
CN 2792111 Y 6/2006

(Continued)

OTHER PUBLICATIONS

"Professional T-Handle Preset Torque Wrench Tool 1.8Nm/2.5Nm for Standard 1/4" Hex Bits, Bits Not Included—AliExpress," accessed on the internet at https://www.aliexpress.com/item/1005004577503256.html#nav-specification, retrieved Dec. 20, 2024, 10pgs.

(Continued)

*Primary Examiner* — David B. Thomas
(74) *Attorney, Agent, or Firm* — Stinson LLP

(57) ABSTRACT

A torque driver for rotating a component, such as a fastener or nut, components thereof, and associated methods. The torque driver for rotating a component includes a housing having a first set of ratchet teeth. A drive connector is coupled to the housing such that the drive connector and the housing rotate together when the drive connector is rotated by a drive device. An output drive has a second set of ratchet teeth engaged with the first set of ratchet teeth of the housing. The first and second sets of ratchet teeth rotate relative to one another when the torque imparted by the drive device exceeds a predetermined torque. The output drive has a component driver that operatively connects to the component to rotate the component. A torque adjuster is selectively movable relative to the output drive to selectively change the predetermined torque.

72 Claims, 7 Drawing Sheets

Related U.S. Application Data

No. 18/052,294, filed on Nov. 3, 2022, now Pat. No. 12,304,037.

(60) Provisional application No. 63/263,454, filed on Nov. 3, 2021.

(56) References Cited

U.S. PATENT DOCUMENTS

| | | | | |
|---|---|---|---|---|
| 3,667,250 | A * | 6/1972 | Schnepel | B25B 23/141 464/36 |
| 3,702,546 | A * | 11/1972 | Schnepel | F16D 7/08 464/36 |
| 3,889,490 | A * | 6/1975 | Nadolny | B25B 23/1427 464/23 |
| 3,890,859 | A * | 6/1975 | Grabovac | B25B 23/1427 81/474 |
| 4,262,501 | A * | 4/1981 | Vaughn | F16D 7/08 464/36 |
| 4,346,633 | A * | 8/1982 | Rendl | B25B 13/466 81/475 |
| 6,132,435 | A | 10/2000 | Young | |
| 7,150,212 | B2 * | 12/2006 | Lee | B25B 23/1427 81/475 |
| 7,160,109 | B2 | 1/2007 | Gervais et al. | |
| 7,225,884 | B2 | 6/2007 | Aeberhard | |
| 7,243,581 | B1 | 7/2007 | Gao | |
| 7,281,458 | B2 | 10/2007 | Chuang | |
| 7,354,346 | B2 | 4/2008 | Takada et al. | |
| 7,360,607 | B2 | 4/2008 | Aeberhard | |
| 7,455,123 | B2 | 11/2008 | Aeberhard | |
| 7,467,576 | B2 | 12/2008 | Gao | |
| 7,503,443 | B1 | 3/2009 | Dobras | |
| 7,650,821 | B2 * | 1/2010 | Gauthier | B25B 23/141 81/476 |
| 7,690,082 | B2 | 4/2010 | Chuang | |
| 7,967,683 | B2 | 6/2011 | Chuang | |
| 8,021,365 | B2 | 9/2011 | Phan | |
| 8,021,366 | B2 | 9/2011 | Phan | |
| 8,104,546 | B2 | 1/2012 | Aeberhard | |
| 8,122,794 | B2 * | 2/2012 | Lai | B25B 15/001 81/475 |
| 8,161,849 | B2 | 4/2012 | Stark et al. | |
| 8,220,369 | B2 * | 7/2012 | Lai | B25B 23/1427 81/475 |
| 8,221,431 | B2 | 7/2012 | Chenaux | |
| 8,317,791 | B2 | 11/2012 | Phan | |
| 8,359,955 | B2 * | 1/2013 | Deneault | B25B 23/1427 81/473 |
| 8,376,863 | B2 | 2/2013 | Wernz et al. | |
| 8,475,466 | B2 | 7/2013 | Chenaux | |
| 8,549,963 | B2 | 10/2013 | Chuang | |
| 8,590,433 | B2 | 11/2013 | Komeyama et al. | |
| 8,602,899 | B2 * | 12/2013 | You | F16D 43/206 464/36 |
| 8,631,726 | B2 | 1/2014 | Ehlers et al. | |
| 8,667,870 | B2 | 3/2014 | Teper | |
| 8,714,056 | B2 | 5/2014 | Landowski | |
| 8,833,211 | B2 | 9/2014 | Chuang | |
| 8,960,058 | B2 * | 2/2015 | Lai | B25B 23/141 81/475 |
| 8,973,475 | B2 * | 3/2015 | Lai | B25B 15/00 81/475 |
| 9,107,721 | B2 | 8/2015 | Plotkin | |
| 9,169,882 | B2 | 10/2015 | Witte | |
| 9,216,496 | B2 * | 12/2015 | Gauthier | B25B 15/02 |
| 9,241,751 | B2 * | 1/2016 | Nino | B25B 13/466 |
| 9,242,357 | B2 * | 1/2016 | Nino | B25B 23/1427 |
| 9,505,428 | B2 | 11/2016 | Chai et al. | |
| 9,550,289 | B2 | 1/2017 | Parks | |
| 9,555,526 | B1 * | 1/2017 | Gauthier | B25B 23/141 |
| 9,572,617 | B1 | 2/2017 | Prado et al. | |
| 9,668,797 | B2 | 6/2017 | Ivinson et al. | |
| 9,693,814 | B2 | 7/2017 | Schaller et al. | |
| 9,695,882 | B2 | 7/2017 | Jakoubek | |
| 9,731,407 | B1 * | 8/2017 | Edmisten | B25B 23/141 |
| 9,757,175 | B2 | 9/2017 | Plotkin | |
| 9,868,184 | B2 | 1/2018 | Moss et al. | |
| 9,931,741 | B2 | 4/2018 | Nino et al. | |
| 9,937,009 | B2 | 4/2018 | Schroeder et al. | |
| 10,034,701 | B2 | 7/2018 | Adamiec | |
| 10,065,296 | B2 | 9/2018 | Chuang | |
| 10,160,105 | B2 | 12/2018 | Nino et al. | |
| 10,219,854 | B2 | 3/2019 | Nino et al. | |
| 10,232,501 | B2 | 3/2019 | Sawano et al. | |
| 10,274,021 | B2 | 4/2019 | Victor et al. | |
| 10,315,296 | B2 | 6/2019 | Victor et al. | |
| 10,343,269 | B2 | 7/2019 | Nino et al. | |
| 10,357,870 | B2 * | 7/2019 | Hsieh | B25B 17/02 |
| 10,413,345 | B2 | 9/2019 | Plotkin | |
| 10,471,575 | B2 | 11/2019 | Nino et al. | |
| 10,471,581 | B2 | 11/2019 | Parks | |
| 10,588,640 | B2 | 3/2020 | Steinhauser et al. | |
| 10,596,687 | B2 | 3/2020 | Chuang | |
| 10,618,149 | B2 | 4/2020 | Nino et al. | |
| 10,688,634 | B2 | 6/2020 | Nino et al. | |
| 10,702,284 | B2 | 7/2020 | Hogerle et al. | |
| 10,920,833 | B2 | 2/2021 | Nino et al. | |
| 11,027,402 | B2 | 6/2021 | Chuang | |
| 11,090,745 | B2 * | 8/2021 | Lin | B23G 1/16 |
| 11,097,404 | B2 | 8/2021 | Farmer | |
| 11,203,102 | B2 * | 12/2021 | Nino | A61B 17/8875 |
| 11,207,764 | B2 * | 12/2021 | Huang | B25B 23/1427 |
| 11,253,983 | B2 * | 2/2022 | Chiang | B25B 23/141 |
| 11,260,508 | B2 * | 3/2022 | Huang | B25B 23/0035 |
| 11,446,798 | B2 * | 9/2022 | Lin | B25B 23/0035 |
| 11,878,393 | B2 * | 1/2024 | Heath | B25B 13/06 |
| 12,304,037 | B2 * | 5/2025 | Cottrell | B25B 23/0035 |
| 2006/0236825 | A1 * | 10/2006 | Chiou | B25B 23/1427 81/475 |
| 2007/0155202 | A1 | 7/2007 | Chuang | |
| 2007/0192994 | A1 | 8/2007 | Chuang | |
| 2009/0044668 | A1 * | 2/2009 | Lin | B25B 23/1427 81/478 |
| 2013/0025898 | A1 * | 1/2013 | Suzuki | B25B 21/002 173/214 |
| 2014/0083261 | A1 * | 3/2014 | Wang | B25B 13/48 81/473 |
| 2017/0217000 | A1 | 8/2017 | Dierickx et al. | |
| 2017/0365949 | A1 | 12/2017 | Montena et al. | |
| 2018/0133871 | A1 | 5/2018 | Farmer | |
| 2018/0290273 | A1 | 10/2018 | Tory et al. | |
| 2018/0297184 | A1 | 10/2018 | Bailey et al. | |
| 2018/0354040 | A1 | 12/2018 | Cohn et al. | |
| 2019/0321948 | A1 | 10/2019 | Chuang | |
| 2019/0344369 | A1 * | 11/2019 | Lin | B23G 1/28 |
| 2019/0358792 | A1 | 11/2019 | Nino et al. | |
| 2020/0008854 | A1 | 1/2020 | Plotkin | |
| 2020/0011400 | A1 | 1/2020 | Tory | |
| 2021/0299829 | A1 * | 9/2021 | Kuo | B25B 23/1427 |
| 2021/0323126 | A1 * | 10/2021 | Chuang | F16D 7/10 |
| 2021/0339364 | A1 * | 11/2021 | Lin | B25B 23/141 |
| 2022/0032428 | A1 * | 2/2022 | Hung | B25B 23/1427 |
| 2022/0080567 | A1 * | 3/2022 | Lin | B25B 23/1427 |
| 2023/0415312 | A1 * | 12/2023 | Lin | B25B 23/141 |

FOREIGN PATENT DOCUMENTS

| | | | |
|---|---|---|---|
| CN | 2883769 | Y | 3/2007 |
| CN | 2888161 | Y | 4/2007 |
| CN | 200964995 | Y | 10/2007 |
| CN | 201037500 | Y | 3/2008 |
| CN | 101188809 | A | 5/2008 |
| CN | 201078393 | Y | 6/2008 |
| CN | 201098858 | Y | 8/2008 |
| CN | 201147915 | Y | 11/2008 |
| CN | 201255175 | Y | 6/2009 |
| CN | 100522495 | C | 8/2009 |
| CN | 201998113 | U | 10/2011 |
| CN | 101360586 | B | 4/2012 |
| CN | 101222680 | B | 7/2012 |
| CN | 102883738 | A | 1/2013 |

(56) References Cited

FOREIGN PATENT DOCUMENTS

| | | | |
|---|---|---|---|
| CN | 202668445 | U | 1/2013 |
| CN | 102057174 | B | 4/2014 |
| CN | 204420889 | U | 6/2015 |
| CN | 104869704 | A | 8/2015 |
| CN | 204554738 | U | 8/2015 |
| CN | 204648131 | U | 9/2015 |
| CN | 204761754 | U | 11/2015 |
| CN | 205277333 | U | 6/2016 |
| CN | 104169048 | B | 8/2016 |
| CN | 105941693 | A | 9/2016 |
| CN | 103778026 | B | 3/2017 |
| CN | 206445739 | U | 8/2017 |
| CN | 207014254 | U | 2/2018 |
| CN | 107847235 | A | 3/2018 |
| CN | 107847238 | A | 3/2018 |
| CN | 103793424 | B | 4/2018 |
| CN | 108429701 | A | 8/2018 |
| CN | 104848182 | B | 9/2018 |
| CN | 208179386 | U | 12/2018 |
| CN | 208231659 | U | 12/2018 |
| CN | 109538082 | A | 3/2019 |
| CN | 109779205 | A | 5/2019 |
| CN | 109779371 | A | 5/2019 |
| CN | 208913975 | U | 5/2019 |
| CN | 109877756 | A | 6/2019 |
| CN | 209098613 | U | 7/2019 |
| CN | 110542036 | A | 12/2019 |
| CN | 209724094 | U | 12/2019 |
| CN | 209782334 | U | 12/2019 |
| CN | 209782335 | U | 12/2019 |
| CN | 107104897 | B | 3/2020 |
| CN | 210288774 | U | 4/2020 |
| CN | 210891173 | U | 6/2020 |
| CN | 111628934 | A | 9/2020 |
| CN | 111629079 | A | 9/2020 |
| CN | 211402109 | U | 9/2020 |
| CN | 211524240 | U | 9/2020 |
| CN | 111865940 | A | 10/2020 |
| CN | 212130303 | U | 12/2020 |
| DE | 60004376 | T2 | 4/2004 |
| DE | 102004051911 | A1 | 4/2006 |
| DE | 102004058807 | A1 | 6/2006 |
| DE | 102004058808 | A1 | 6/2006 |
| DE | 502007002048 | | 12/2009 |
| DE | 202012100444 | U1 | 5/2012 |
| DE | 102006032812 | B4 | 6/2012 |
| DE | 202014002171 | U1 | 6/2015 |
| DE | 202016104553 | U1 | 10/2016 |
| DE | 102015111877 | A1 | 1/2017 |
| DE | 102015111878 | A1 | 1/2017 |
| DE | 202017102507 | U1 | 7/2017 |
| DE | 202016005520 | U1 | 12/2017 |
| DE | 102004007372 | B4 | 2/2018 |
| DE | 102016010890 | A1 | 3/2018 |
| DE | 102016010891 | A1 | 3/2018 |
| DE | 102016013174 | A1 | 5/2018 |
| DE | 102016013179 | A1 | 5/2018 |
| DE | 202016008561 | U1 | 6/2018 |
| DE | 112017004147 | A5 | 5/2019 |
| EP | 1212173 | B1 | 8/2003 |
| EP | 1996371 | B1 | 11/2009 |
| EP | 1909673 | B1 | 1/2012 |
| EP | 2311397 | B1 | 5/2012 |
| EP | 1824643 | B1 | 7/2012 |
| EP | 2097028 | B1 | 9/2013 |
| EP | 2025296 | B1 | 11/2013 |
| EP | 2287485 | B1 | 1/2014 |
| EP | 2425935 | B1 | 6/2015 |
| EP | 2826597 | B1 | 10/2016 |
| EP | 3125791 | A4 | 11/2017 |
| EP | 3324859 | A2 | 5/2018 |
| EP | 3324860 | A2 | 5/2018 |
| EP | 3125773 | A4 | 11/2018 |
| EP | 3206838 | B1 | 12/2018 |
| EP | 2948093 | B1 | 4/2019 |
| EP | 3359341 | A4 | 4/2019 |
| EP | 3087935 | B1 | 5/2019 |
| EP | 3500768 | A1 | 6/2019 |
| EP | 3359837 | A4 | 7/2019 |
| EP | 3507522 | A1 | 7/2019 |
| EP | 3507523 | A1 | 7/2019 |
| EP | 3538322 | A1 | 9/2019 |
| EP | 3359065 | A4 | 10/2019 |
| EP | 2745988 | B1 | 11/2019 |
| EP | 3097886 | B1 | 11/2019 |
| EP | 2918374 | B1 | 1/2020 |
| EP | 3359838 | A4 | 1/2020 |
| EP | 3359839 | A4 | 1/2020 |
| JP | 2007050502 | A | 3/2007 |
| JP | 2009500147 | A | 1/2009 |
| JP | 2009293680 | A | 12/2009 |
| JP | 4545123 | B2 | 9/2010 |
| JP | 2009524528 | A | 12/2011 |
| JP | 4979698 | B2 | 7/2012 |
| JP | 5176700 | B2 | 4/2013 |
| JP | 5227188 | B2 | 7/2013 |
| JP | 2013188823 | A | 9/2013 |
| JP | 2015188943 | A | 11/2015 |
| JP | 5895159 | B2 | 3/2016 |
| JP | 2017212903 | A | 12/2017 |
| JP | 6354978 | B2 | 7/2018 |
| JP | 2018520793 | A | 8/2018 |
| JP | 2018527524 | A | 9/2018 |
| JP | 6817285 | B2 | 1/2021 |
| TW | 537346 | U | 6/2003 |
| TW | 539040 | U | 6/2003 |
| TW | 574089 | B | 2/2004 |
| TW | 595641 | U | 6/2004 |
| TW | M274427 | U | 9/2005 |
| TW | M281386 | U | 11/2005 |
| TW | M285186 | U | 1/2006 |
| TW | I255215 | B | 5/2006 |
| TW | M309323 | U | 4/2007 |
| TW | M315954 | U | 7/2007 |
| TW | M324950 | U | 1/2008 |
| TW | M327270 | U | 2/2008 |
| TW | I300377 | B | 9/2008 |
| TW | M339398 | U | 9/2008 |
| TW | M348463 | U | 1/2009 |
| TW | I408030 | B | 9/2013 |
| TW | 201802375 | A | 1/2018 |
| TW | M571787 | U | 12/2018 |
| TW | M598760 | U | 7/2020 |
| WO | 2015153204 | A1 | 10/2015 |
| WO | 2015153376 | A1 | 10/2015 |
| WO | 2016059039 | A1 | 4/2016 |
| WO | 2018089822 | A1 | 5/2018 |
| WO | 2018191590 | A1 | 10/2018 |
| WO | 2018231976 | A1 | 12/2018 |

OTHER PUBLICATIONS

AliExpressProfessional T-Handle Preset Torque Wrench Tool 1.8Nm/2.5Nm for Standard 1/4" Hex Bits, Bits Not Included, https://www.aliexpress.com/item/1005004577503256.html#nav-specification. Image of Product Purchased Prior to Nov. 24, 2020, 1pg.

* cited by examiner

TORQUE DRIVER

CROSS-REFERENCE TO RELATED APPLICATIONS

The present application claims priority to and is a continuation of U.S. patent application Ser. No. 19/175,256, filed Apr. 10, 2025, which is a continuation of U.S. patent application Ser. No. 18/052,294, filed Nov. 3, 2022, issued U.S. Pat. No. 12,304,037, which claims priority to U.S. Provisional Application No. 63/263,454, filed Nov. 3, 2021, the entireties of which are hereby incorporated by reference.

FIELD

The present disclosure generally relates to torque drivers, and more particularly to torque drivers that limit the amount of torque delivered.

BACKGROUND

Torque drivers, such as screwdrivers, are used to rotate (e.g., screw or wrench) a component, such as a fastener (e.g., bolt, screw), nut, and the like. Often times, torque drivers are used to tighten and secure the component in place. In certain situations, it is desirable for the torque driver to limit the amount of torque applied to the component.

SUMMARY

In one aspect, a torque driver for rotating a component comprises a housing having opposite proximal and distal ends and a longitudinal axis extending between the proximal and distal ends. The housing defines an interior. The housing includes a first set of ratchet teeth in the interior. A drive connector is configured to be engaged by a drive device. The drive connector is coupled to the housing such that the drive connector and the housing rotate together when the drive connector is rotated by the drive device. The drive connector is adjacent the proximal end of the housing. An output drive is adjacent the distal end of the housing. The output drive includes a second set of ratchet teeth engaged with the first set of ratchet teeth of the housing. The first and second sets of ratchet teeth are sized and shaped to rotate relative to one another when torque imparted on the drive connector by the drive device exceeds a predetermined torque. The output drive includes a component driver in a fixed relation relative to the second set of ratchet teeth such that the component driver and the second set of ratchet teeth rotate together. The output drive is configured to be operatively connected to the component to rotate the component. A biasing member is disposed in the interior. The biasing member applies a biasing force that correlates to the predetermined torque against the output drive to bias the second set of ratchet teeth toward the first set of ratchet teeth. A torque adjuster is disposed in the interior of the housing. The biasing member has a proximal end engaged with the torque adjuster and a distal end engaged with the output drive. The torque adjuster is selectively movable along the longitudinal axis relative to the output drive to selectively change an amount of the biasing force to change the predetermined torque.

In another aspect, a torque driver for rotating a component comprises a housing having opposite proximal and distal ends and a longitudinal axis extending between the proximal and distal ends. The housing defines an interior. A drive connector is configured to be engaged by a drive device. The drive connector is coupled to the housing such that the drive connector and the housing rotate together when the drive connector is rotated by the drive device. The drive connector is adjacent the proximal end of the housing. A component driver is configured to be operatively connected to the component to rotate the component. The component driver is adjacent the distal end of the housing. A clutch assembly is operatively connecting the drive connector and the component driver such that the drive connector rotates with the component driver when the component driver is rotated by the drive device and torque imparted on the drive connector by the drive device is below the predetermined torque. The clutch assembly is arranged to permit the drive connector and the component driver to rotate relative to one another when torque imparted on the drive connector by the drive device exceeds the predetermined torque. The clutch assembly includes a torque adjuster disposed in the interior of the housing. The torque adjuster is engaged to and supported by the housing. The torque adjuster is selectively movable along the longitudinal axis relative to the housing to adjust the predetermined torque.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
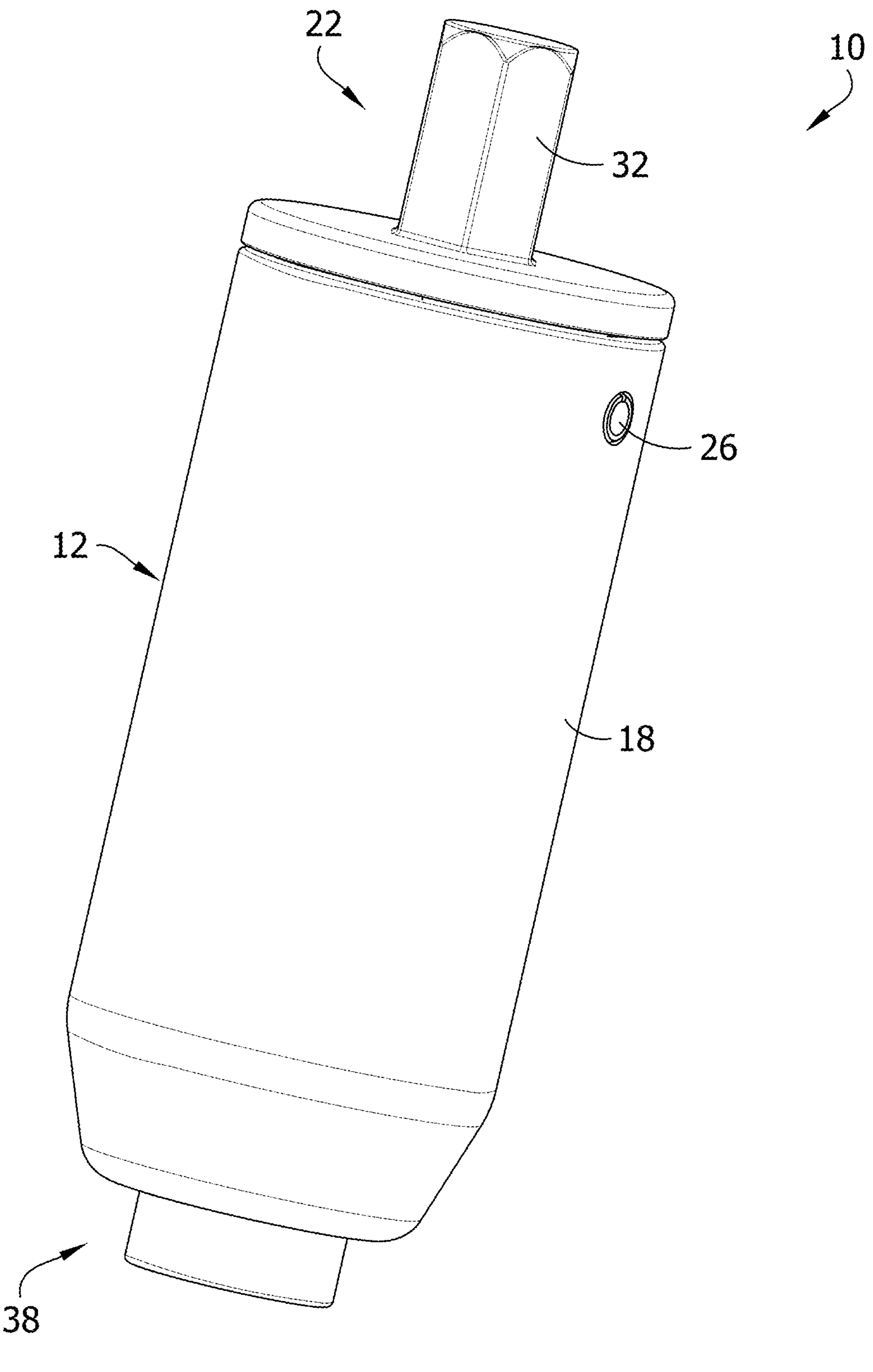
FIG. 1 is a perspective of a torque driver of the present disclosure.

Referring to FIG. 1, a torque driver of the present disclosure is generally indicated by reference numeral 10. The torque driver 10 is used to rotate components (not shown), such as fasteners (e.g., screws, bolts, etc.), nuts, etc. The torque driver 10 allows an operator or worker to torque the component to a preset or predetermined torque. The torque driver 10 is able to torque or rotate the component and then-once the predetermined torque has been reached-is inhibited from being able to further rotate the component. The torque driver 10 is configured to be operatively disposed between a drive device (not shown), such as a handle, wrench, power tool (e.g., power drill), and the like, and the component to torque the component to the predetermined torque.

Referring to FIGS. 1-4, the torque driver 10 includes a housing 12 having opposite proximal and distal ends. A longitudinal axis LA extends between the proximal and distal ends. The housing 12 defines an interior 14. The interior 14 has an open proximal end at the proximal end of the housing. The housing 12 defines a longitudinal bore 16 extending distally from the distal end of the interior 14 to the distal end of the housing. The housing 12 includes a generally cylindrical wall 18. The interior surface of the cylindrical wall 18 includes threading 20 (e.g., internal threading).

The torque driver 10 includes a fixed drive 22 coupled to the proximal end of the housing 12. The fixed drive 22 includes a plug 24 with threading (e.g., external threading) for threadably coupling the fixed drive 22 to the housing 12 (via the threading 20). This allows the fixed drive 22 to be removed or decoupled from the housing 12, for reasons that will become apparent. The torque driver 10 includes a retainer 26 for securing the fixed drive 22 to the housing 12. In the illustrated embodiment, the retainer 26 comprises a retaining pin, such as a radially expandable spring pin (e.g., split spring dowel pin). The retaining pin 26 engages the housing 12 and the fixed drive 22 to inhibit the fixed drive from moving (e.g., rotating or unscrewing) relative to the housing. The retaining pin 22 is disposed in aligned openings 28 in the wall 18 of the housing 12 and extends through the interior 14. The plug 24 includes one or more channels or recesses 30 sized and shaped to receive the retaining pin 22. The retaining pin 22 is disposed in one of the channels 30 to prevent the plug 24 from rotating relative to the housing. In the illustrated embodiment, the plug 24 includes three channels 30 arranged in a spoke pattern so that regardless of how the plug 24 is threaded to the housing 12, one of the channels will align with the openings 28. The expandability of the retaining pin 26 secures the pin to the housing 12. In operation, to remove the fixed drive 22, the operator pushes the retaining pin 26 out of the housing 12 using any suitable tool and then unscrews the plug 24. To attach the fixed drive 22, the operator screws the plug 24 into the housing 12 and then pushes the retaining pin 26 into the aligned openings 28 and channel 30 aligned with the openings. Other configurations of the retainer are within the scope of the present disclosure.

The fixed drive 22 includes a drive connector 32. The drive connector is configured to be engaged by or connected to a drive device (broadly, connect the torque driver 10 to a drive device). In the illustrated embodiment, the drive connector 32 comprises a socket engaging stud or tenon, such as a hexagon or square cross-sectional shaped stud. Other configurations of the drive connector are within the scope of the present disclosure. The drive connector 32 is adjacent the proximal end of the housing 12. The drive connector 32 is coupled to the housing 12 such that the drive connector and the housing rotate together when the drive connector is rotated by the drive device. In the illustrated embodiment, the retainer 26 ensures the fixed drive 22 (e.g., drive connector 32) and the housing 12 rotate together. In other words, the fixed drive 22 and the housing 12 are rotateably fixed relative to one another.

The torque driver 10 includes an output drive 34 adjacent the distal end of the housing 12. The output drive 34 includes a first clutch member or plate 36 and a component driver 38. The first clutch member 36 is disposed in the interior 14 of the housing 12. The first clutch member 36 (broadly, the output drive 34) can rotate relative to the housing 12. The first clutch member 36 and the component driver 38 are coupled together such that the they rotate together. The component driver 38 includes a drive shaft 40 extending from the first clutch member 36. The drive shaft 40 is disposed in the bore 16 of the housing 12 and can rotate within the bore about the longitudinal axis LA relative to the housing. The component driver 38 projects distally from the distal end of the housing 12. The component driver 38 is configured to be operatively connected to the component to rotate the component. In the illustrated embodiment, the component driver 38 includes a socket. The socket can be sized and shaped to receive (e.g., engage) the component or another tool (such as a screw driver bit or socket bit) that engages the component. Other configurations of the component driver are within the scope of the present disclosure. For example, the component driver can include any suitable driver, such as the socket, a flat head screwdriver, a Philips head screwdriver, etc., for operatively connecting to the component.

The first clutch member 36 includes a set of ratchet teeth 42. The ratchet teeth 42 face distally. The ratchet teeth 42 are arrange circumferentially around the drive shaft 40. Each tooth 42 includes a ramp and a flat. The ramp is oriented at a shallow angle to a plane normal to the longitudinal axis LA and the flat is generally parallel to the longitudinal axis LA. Each tooth 42 may have a rounded or flattened tip. It is believed rounding or flattening the tips of the ratchet teeth 42 makes them more durable, extending the operational life of the torque driver 10.

The torque driver 10 includes a second clutch member 44. The first and second clutch members 36, 44 are arranged to rotate together when the torque imparted on the drive connector 32 by the drive device is below the predetermined torque and are arranged to rotate relative to one another when the torque imparted on the drive connector by the drive device is equal to or exceeds the predetermined torque. The second clutch member 44 includes a set of ratchet teeth 46, which are generally a mirror image of the set of ratchet teeth 42 of the first clutch member 36. The ratchet teeth 46 of the second clutch member 46 faced proximally. The ratchet teeth 46 are arranged circumferentially around the bore 16 of the housing 12. Each tooth 46 of the second clutch member 44 includes a ramp and a flat and may have a rounded or flattened tip, as described above in relation to the teeth 42 of the first clutch member 36. In the illustrated embodiment, the first and second clutch members 36, 44 are engaged with one another. Specifically, the first and second sets of ratchet teeth 42, 46 are engaged with one another. The first and second sets of ratchet teeth 42, 46 are sized and shaped to move (e.g., rotate) together, so that the drive connector 32 and component driver 38 rotate together, when the applied torque is less than the predetermined torque. The first and second sets of ratchet teeth 42, 46 are sized and shaped to move (e.g., rotate) relative to one another, so that the drive connector 32 and component driver 38 rotate relative to one another, when the applied torque is equal to or exceeds than the predetermined torque.

The second clutch member 44 rotates with (e.g., is rotateably fixed to) the housing 12. In the illustrated embodiment, the second clutch member 44 (e.g., the set of ratchet teeth 46) are part of the housing 12 (the housing includes the ratchet teeth). That is, the second clutch member 44 is an integral part of the housing 12. Desirably, the second clutch member 44 and the housing 12 are an integral, one-piece component, as illustrated. Similarly, the first clutch member 36 rotates with (e.g., is rotateably fixed to) the component driver 38. Specifically, the component driver 38 is in a fixed relation relative to the set of ratchet teeth of the output drive 34 such that the component driver and the set of ratchet teeth rotate together. Desirably, the first clutch member 36 and the component driver 38 are an integral, one-piece component (broadly, the output drive 34 is an integral, one-piece component). Having the housing 12 and the output drive 34 be integral, one-piece components simplifies manufacturing and reduces assembly time by reducing the number of components that need to be manufactured and assembled. This also simplifies the operation of the torque driver 10 by having less parts than conventional torque drivers. The fewer the number the parts the less opportunity for something to go wrong. Other configurations are within the scope of the present disclosure. For example, in one embodiment, the first clutch member and the component driver may be separate elements coupled together, such as by welding or with a fastener. In one embodiment, the second clutch member and the housing may be separate elements as well. In this embodiment, the second clutch member is disposed in the interior of the housing and is constrained to rotate with the housing. For example, the second clutch member and the housing can be keyed so that they rotate together. In another example, the one of the second clutch member and the housing can include one or more projections and the other of the second clutch member and the housing can include one or more corresponding recesses. The projections mate with the corresponding recesses to inhibit the second clutch member and the housing from rotating relative to one another.

Figure 2:
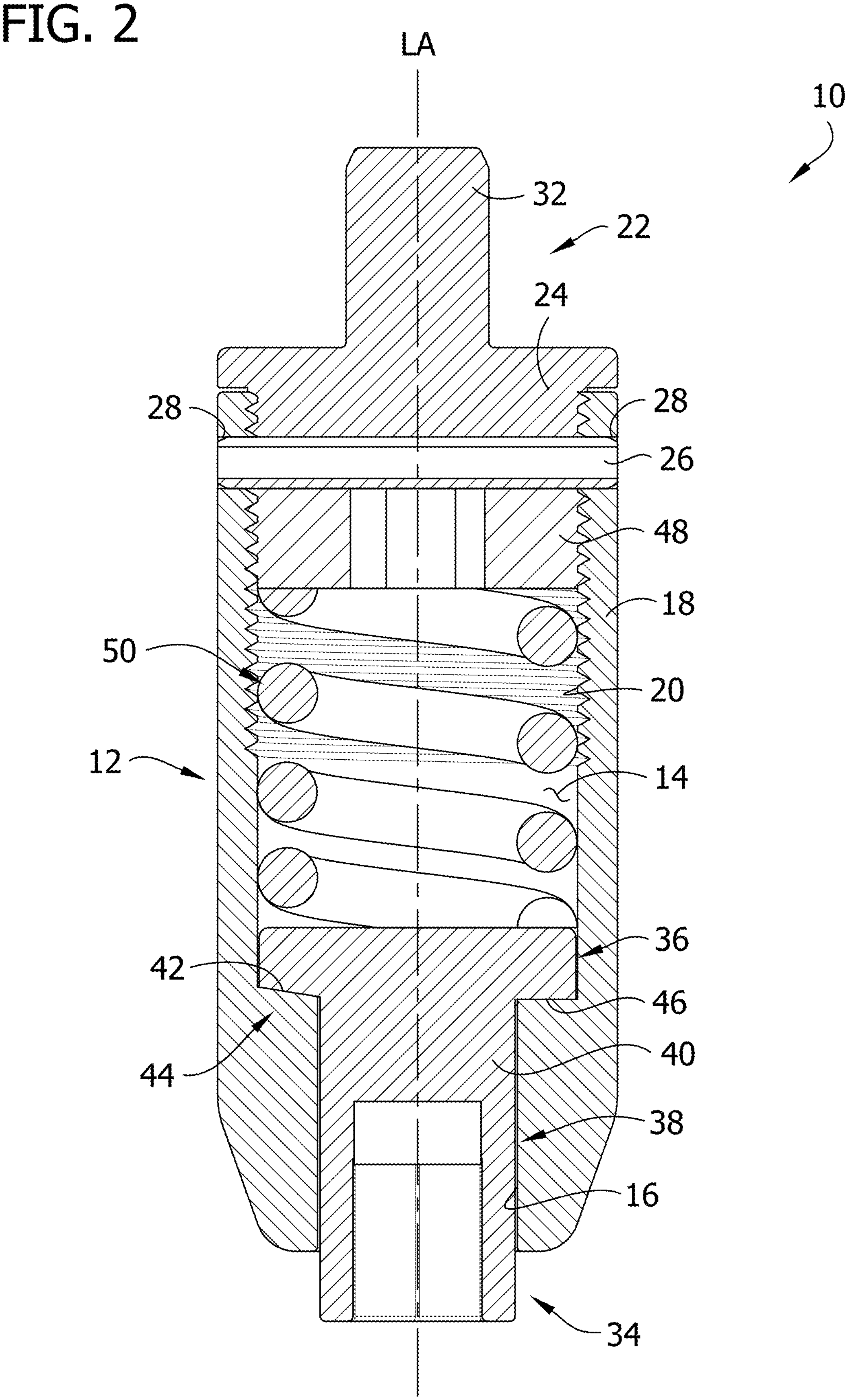
FIG. 2 is a cross-section of the torque driver of FIG. 1.
Figure 3:
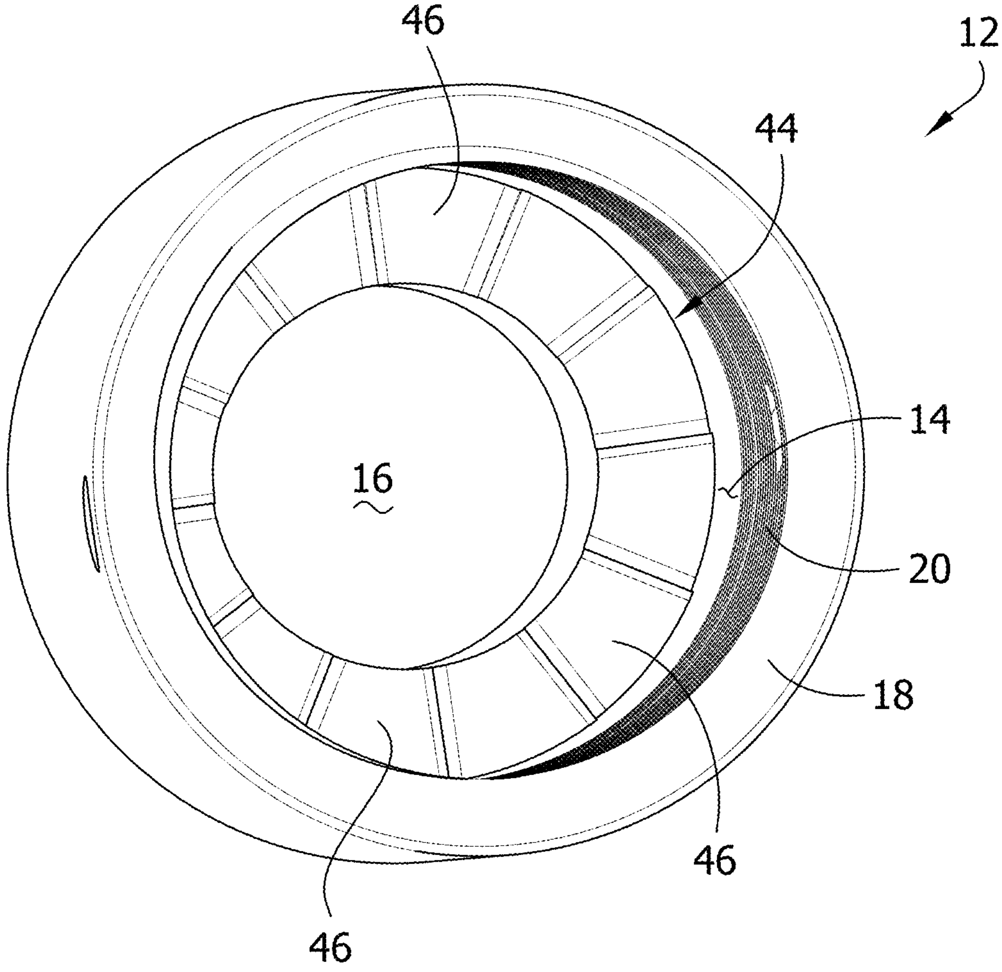
FIG. 3 is a perspective of a housing of the torque driver of FIG. 1.
Figure 4:
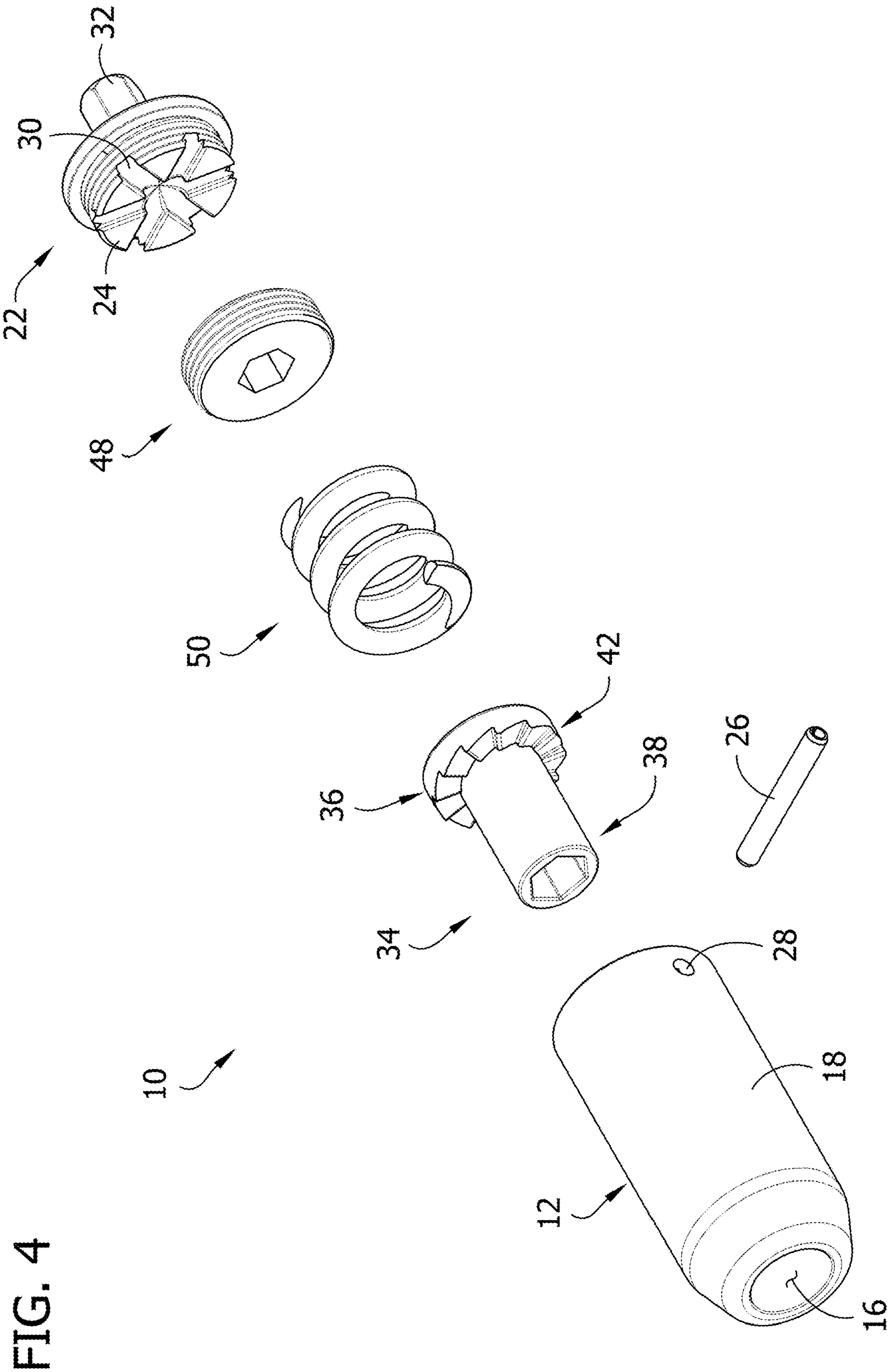
FIG. 4 is an exploded view of the torque driver of FIG. 1.

Referring to FIGS. 2 and 4, the torque driver 10 includes a torque adjuster 48 and a biasing member 50. The biasing member 50 is disposed in the interior of the housing 12. The biasing member 50 biases the first clutch member 36, distally, toward the second clutch member 44. In the illustrated embodiment, the biasing member 50 biases the output drive (e.g., set of ratchet teeth 42 thereof) into engagement with the second clutch member 44 (e.g., set of ratchet teeth 46 thereof). The biasing member 50 has a proximal end engaged with the torque adjuster 48 and a distal end engaged with the output drive 34 (specifically, the first clutch member 36). In the illustrated embodiment, the biasing member 50 comprises a coiled spring, although other configurations are within the scope of the present disclosure. The biasing member 50 applies a biasing force against the output drive 34 to bias the set of ratchet teeth 42 thereof toward (and into engagement with) the set of ratchet teeth 46 of the second clutch member 44. The biasing force applied by the biasing member 50 correlates to the predetermine torque. The larger the biasing force, the larger the value of the predetermined torque. Likewise, the smaller the biasing force, the smaller the value of the predetermined torque. The torque adjuster 48 is disposed in the interior 14 of the housing 12. Desirably, the torque adjuster 48 is entirely disposed within the interior 14 of the housing 12, as illustrated, to prevent the torque adjuster from being inadvertently moved relative to the housing 12, thereby inadvertently changing the predetermined torque (as described below). The torque adjuster is disposed between the output drive 34 and the fixed drive 22. The torque adjuster 48 is arranged to adjust or change the value of the predetermined torque. Accordingly, using the torque adjuster 48, the operator can change the predetermined torque. The torque adjuster 48 is selectively movable along the longitudinal axis LA relative to the output drive 34 (e.g., the first clutch member 36) and to the housing 12 to selectively change the amount of the biasing force to change the predetermined torque. The torque adjuster 48 is selectively movable toward the output drive 36 to compress the biasing member 50 to increase the biasing force and thereby increase the predetermined torque and selectively movable away from the output drive to permit the biasing member to expand to decrease the biasing force and thereby decrease the predetermined torque. The torque adjuster 48 is engaged to and supported by the housing 12. The torque adjuster 48 includes threading (e.g., external threading) for threadably coupling the torque adjuster to the housing 12 (via the threading 20). The torque adjuster 48 includes a tool receiver configured to receive a tool, such as a screw driver or Allen wrench, to allow the operator to rotate the torque adjuster to change the longitudinal position of the torque adjuster relative to the housing 12, and thereby change the predetermined torque. In the illustrated embodiment, the tool receiver comprises an Allen wrench opening or recess sized and shaped to receive an Allen wrench, although other types of tool receivers are within the scope of the present disclosure.

The torque driver 10 of the present disclosure has a simpler construction with a minimal number of parts (e.g., only six parts) compared to conventional torque drivers. As a result, the torque driver 10 is simpler to manufacture and quicker to assemble over conventional torque drivers. Accordingly, the torque driver 10 of the present disclosure does not include the more intricate and complicated workings of conventional torque drivers. In the present disclosure, the absence of an element or elements from the figures is intended to indicate such an element or elements is absent from the torque driver 10. For example, as shown in FIG. 2, the biasing member 50 is the one and only element of the torque driver 10 disposed in the interior 14 of the housing 12 between the first clutch member 36 and the torque adjuster 48. In another example, as illustrated, the torque driver 10 is free of an element disposed within the biasing member 50, such as a shaft. However, it is understood that torque drivers having one or more elements than shown in the figures are within the scope of the present disclosure, including the scope as defined by the claims.

The first clutch member 36, the second clutch member 44, the torque adjuster 48 and the spring 50 form a clutch assembly (e.g., ratchet mechanism or torque limiting mechanism) of the torque driver 10. Clutch assemblies of other configurations are within the scope of the present disclosure. The clutch assembly operatively connects the drive connector 32 and the component driver 38. The clutch assembly is arranged such that the drive connector 32 and the component driver 38 rotate together when the torque imparted on the drive connector by the drive device is less than the predetermined torque and is arranged to permit the drive connector and the component driver to rotate relative to one another when the torque imparted on the drive connector by the drive device is equal to or exceeds the predetermined torque. In operation, the set of ratchet teeth 42 of the first clutch member 36 face and engage the set of ratchet teeth 46 of the second clutch member 44. The two sets of ratchet teeth 42, 46 engage each other so that the output drive 34 rotates with the housing 12 when the torque imparted is less than the predetermined torque and disengage or slip past one another so that the output drive does not rotate with the housing (e.g., allow the housing to rotate relative to the output drive) when the torque imparted is equal to or greater than the predetermined torque.

In use, the operator operatively connects the component to be rotated to the component driver 38, such as by engaging the component driver with the component or engaging a tool accessory (e.g., screw driver bit) coupled to the component driver with the component. After, the operator begins using the drive device to rotate the drive connector 32 (broadly, the torque driver 10), which rotates the component driver 38, which rotates the component. At this time, the torque imparted is less than the predetermined torque. The rotation imparted on the drive connector 32 is transferred to the housing 12, which is transferred to the output drive 34 and then to the component. In this case (when the imparted torque is less than the predetermined torque), the fixed drive 22, the housing 12, and the output drive 34 all rotate together. The torque driver 10 is generally used to tighten a component. Accordingly, as the operator continues to rotate the drive connector 32, the resistance (e.g., resistance torque or back torque) imparted by the component against the component driver 38 increases. When this resistance reaches the predetermined torque, continued rotation of the drive connector 32 (broadly, the torque driver 10) causes the two sets of ratchet teeth 42, 46 to slide relative to each other (in particular, the second clutch member 44 rotates relative to the generally stationary first clutch member 36). At this time, the resistance from the component is greater than the biasing force of the biasing member 50. As a result, the output drive 34 no longer rotates as the drive connector 32 and housing 12 continue to rotate. As the drive connector 32 and housing 12 (e.g., set of ratchet teeth 46 of the second clutch member 44) continue to rotate, the ramps of the ratchet teeth 42, 46 slide relative to one another. This causes the output drive 34 to move proximally, against the biasing force of the biasing member 50, in the interior 14 of the housing 12. As the drive connector 32 and housing 12 continue to rotate relative to output drive 34, the ratchet teeth 46 of the second clutch member 44 rotate past one full tooth profile of the ratchet teeth 42 of the first clutch member 36 (e.g., each ratchet tooth 46 of the second clutch member 44 slides past a corresponding ratchet tooth 42 of the first clutch member 36). When this occurs, the biasing force of the biasing member 50 moves the output drive 34 distally to reseat or reengage the sets of ratchet teeth 42, 46. As a result of this movement, an audible click is heard as the output drive 34 is forced against the housing 12, thereby informing the operator that the predetermined torque has been reached. With the predetermined torque is reached, continued rotation of the drive connector 32 will continue to cause the output drive 34 and the housing 12 to rotate or slide relative to each other and produce additional audible clicks, as just described above.

In the illustrated embodiment, the clutch assembly (e.g., the ratchet teeth 42, 46) is unidirectional such that the output drive 34 and drive connector 32 can only rotate relative to one another in one direction. In this embodiment, the drive connector 32 can only rotate clockwise relative to the output drive 34, which corresponds with the torque driver 10 being configured to tighten a component. When the drive connector 32 is rotated in the opposite direction (e.g., counter-clockwise), the output drive 34 always rotates with the drive connector. In this instance, the flats of the ratchet teeth 42, 46 engage each other so that the output drive 34 and drive connector 32 rotate together. The flats inhibit the ratchet teeth 42, 46 from being able to slide past each other when the drive connector 32 is rotated in the counter-clockwise direction. This allows the operator to use the torque driver 10 to remove or loosen a component, without worrying about the clutch assembly disengaging.

Figure 5:
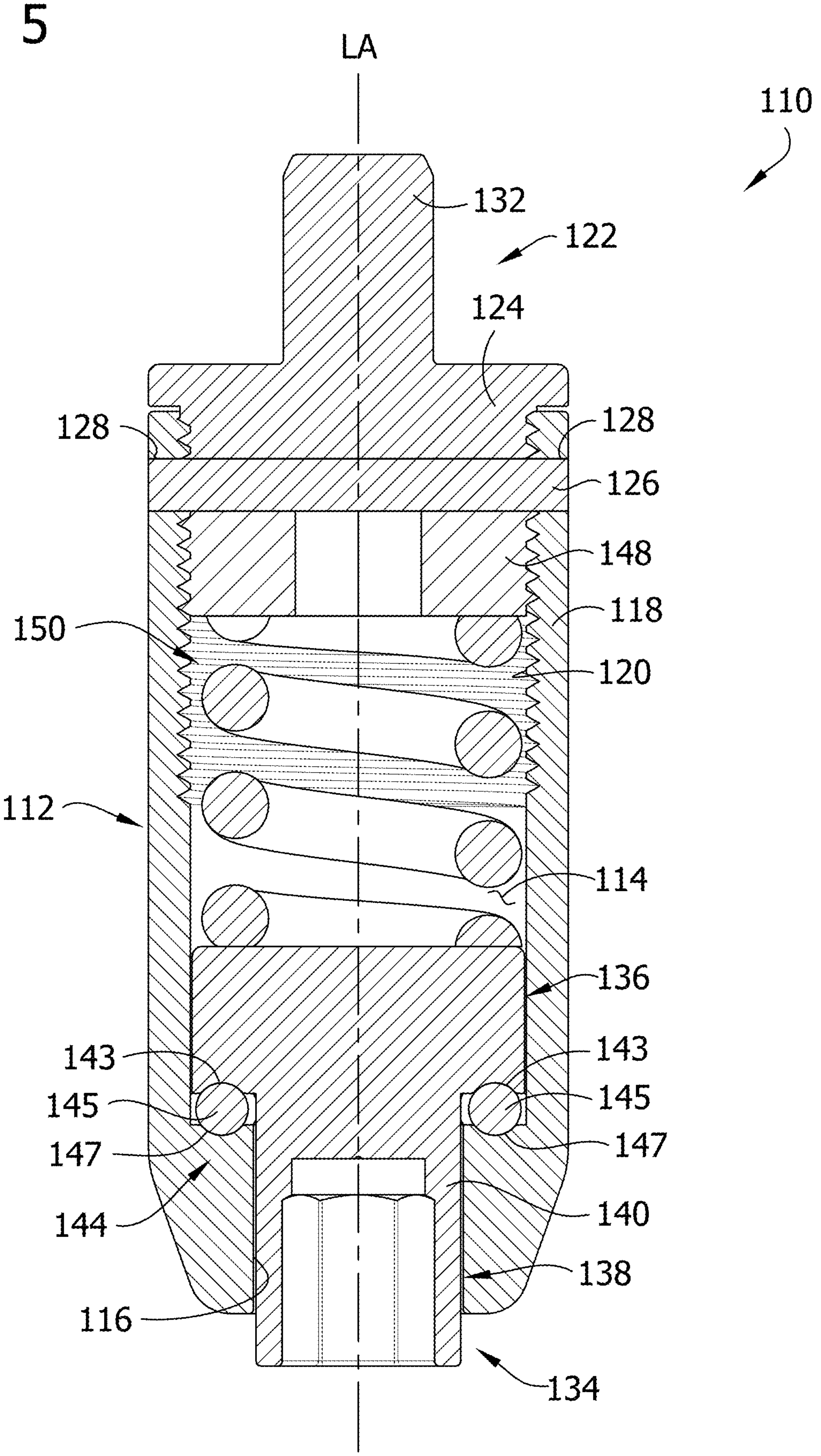
FIG. 5 is a cross-section of a torque driver according to another embodiment of the present disclosure.
Figure 6:
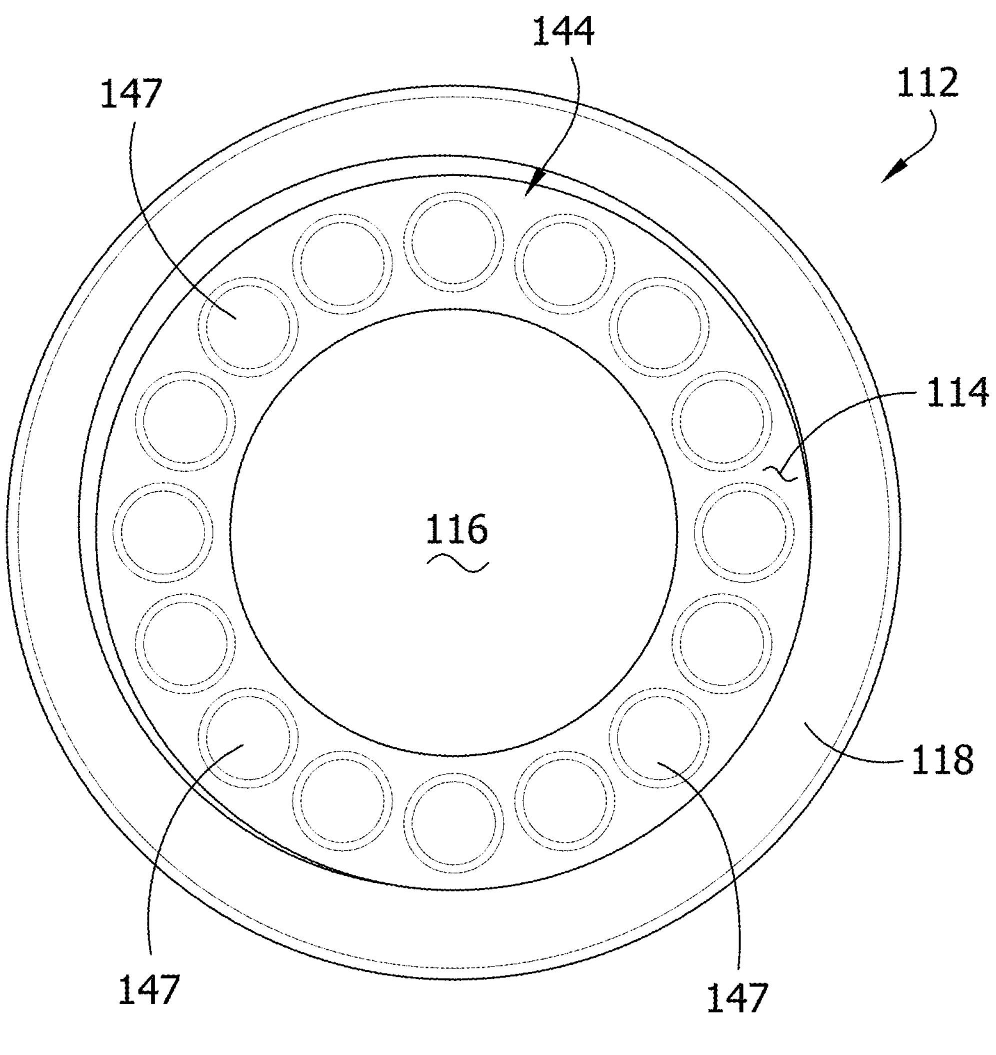
FIG. 6 is a cross-section of a housing of the torque driver of FIG. 5.
Figure 7:
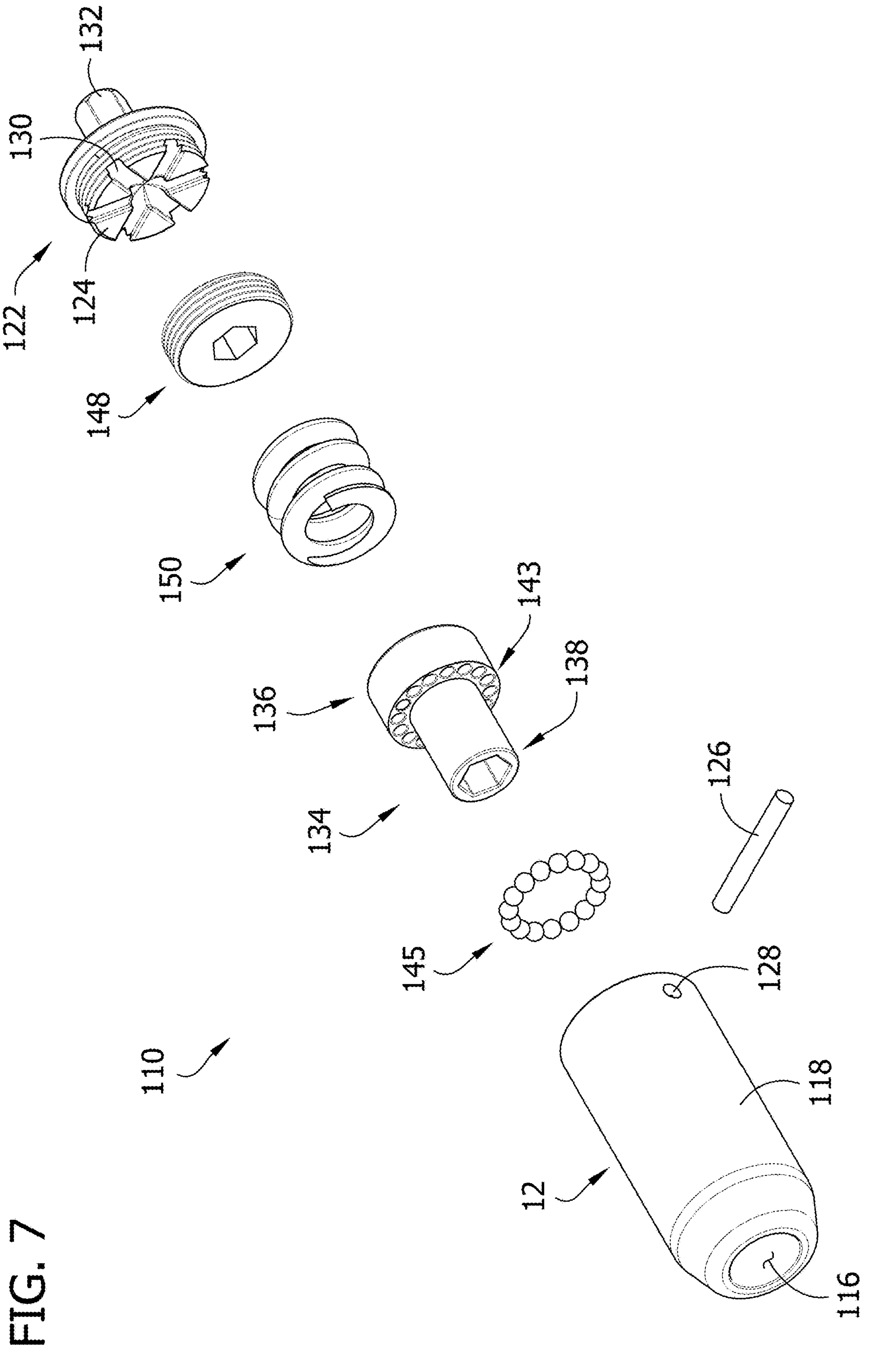
FIG. 7 is an exploded view of the torque driver of FIG. 7.

Referring to FIGS. 5-7, another embodiment of a torque driver according to the present disclosure is generally indicated at reference numeral 110. The torque driver 110 of FIGS. 5-7 is generally analogous to the torque driver 10 of FIGS. 1-4 and, thus, for ease of comprehension, where similar, analogous or identical parts are used, reference numerals "100" units higher are employed. Accordingly, unless clearly stated or indicated otherwise, the above descriptions regarding the torque driver 10 of FIGS. 1-4 also apply to the torque driver 110 of FIGS. 5-7.

In this embodiment, the clutch assembly of the torque driver 110 of FIGS. 5-7 has a different configuration than the clutch assembly of the torque driver 10 of FIGS. 1-4. In this embodiment, the torque driver 110 does not have ratchet teeth. Instead, the torque driver 110 (e.g., the clutch assembly) includes a plurality of balls 145 (e.g., steel balls) disposed between the first and second clutch members 136, 144. The balls 145 are disposed in the interior 114 of the housing 112. The first clutch member 136 includes a set of recesses 143 (e.g., partial hemispherical recesses) and the second clutch member 144 includes a set of recesses 147 (e.g., partial hemispherical recesses) which face the other set. Each recess 143, 147 is sized and shaped to receive a portion of one of the balls 145.

In operation, the clutch assembly of FIGS. 5-7 operates in a similar manner to that of the clutch assembly of FIGS. 1-4. The balls 145 engage the first and second clutch members 136, 144 so that the output drive 134 rotates with the drive connector 132 and housing 112 when the torque imparted is less than the predetermined torque and disengage or slip past one another so that the output drive does not rotate with the drive connector and housing (e.g., allow the housing to rotate relative to the output drive) when the torque imparted is equal to or greater than the predetermined torque. In use, when the two sets of recesses 143, 147 are aligned with one another, the balls 145 are disposed in the recesses. In this position, the drive connector 132 and the component drive 136 (e.g., the first and second clutch members 136, 144) rotate together when the torque connector 110 is rotated by the drive device. At this time, the torque imparted is less than the predetermined torque. The rotation imparted on the drive connector 132 is transferred to the housing 112, which is transferred to the output drive 134 (via the balls 147) and then to the component. In this case, the fixed drive 122, the housing 112, and the output drive 134 all rotate together. As mentioned above, as the operator continues to rotate the drive connector 132, the resistance (e.g., resistance torque or back torque) imparted by the component against the component driver 138 increases. When this resistance reaches the predetermined torque, continued rotation of the drive connector 132 (broadly, the torque driver 110) causes the first and second clutch members 136, 144 to rotate relative to one another (specifically, the second clutch member rotates relative to the generally stationary first clutch member). At this time, the resistance from the component is greater than the biasing force of the biasing member 150. As a result, the output drive 134 no longer rotates as the drive connector 132 and housing 112 continue to rotate. As the drive connector 132 and housing 112 continue to rotate, the recesses 147 of the second clutch member 144 move out of alignment with the recesses 143 of the first clutch member 136. This causes the balls 147 to move (e.g., roll) out of the recesses 147 of the second clutch member 144 and/or the recesses 143 of the first clutch member 136. This causes the output drive 134 to move proximally, against the biasing force of the biasing member 150, in the interior 114 of the housing 112. As the drive connector 132 and housing 112 continue to rotate relative to output drive 134, the recesses 147 of the second clutch member 144 rotate past one full recess profile of the recesses 143 of the first clutch member 136 (e.g., each recess 147 of the second clutch member 44 moves past a corresponding recess 143 of the first clutch member 136), and the recesses and balls 145 become realigned. When this occurs, the biasing force of the biasing member 150 moves the output drive 134 distally to reseat or reengage the sets of recesses 143, 147 with the balls 145. As a result of this movement, an audible click is heard as the output drive 134 is forced distally against the balls 145, thereby informing the operator that the predetermined torque has been reached. With the predetermined torque is reached, continued rotation of the drive connector 132 will continue to cause the output drive 134 and the housing 112 to rotate relative to each other and produce additional audible clicks, as just described above.

In this embodiment, the clutch assembly is bidirectional such that the output drive 134 and drive connector 132 will rotate relative to one another when the predetermined torque is reached regardless of which direction (e.g., clockwise or counter-clockwise) the drive connector (broadly, the torque connector 110) is rotated. In addition, it is believed the balls 147 provide a more durable configuration due to the lack of sharp edges in the clutch assembly.

It will be apparent that modifications and variations are possible without departing from the scope of the disclosure defined in the appended claims.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products without departing from the scope of the claims, it is intended that all matter contained in the above description and shown in the accompanying drawings shall be interpreted as illustrative and not in a limiting sense.

What is claimed is:

1. A torque driver for rotating a component, the torque driver comprising:

a wall having opposite proximal and distal ends and a longitudinal axis extending between the proximal and distal ends, the wall bordering an interior, the interior having a proximal opening, the wall bordering the proximal opening of the interior;

a drive connector configured to be engaged by a drive device, the drive connector being adjacent the proximal end of the wall;

a component driver configured to be operatively connected to the component to rotate the component, the component driver being adjacent the distal end of the wall;

a clutch assembly operatively connecting the drive connector and the component driver such that the drive connector rotates with the component driver when the drive connector is rotated by the drive device and torque imparted on the drive connector by the drive device is below the predetermined torque, the clutch assembly being arranged to permit the drive connector and the component driver to rotate relative to one another when torque imparted on the drive connector by the drive device exceeds the predetermined torque, the clutch assembly including a torque adjuster disposed in the interior, the torque adjuster being supported by the wall, and the torque adjuster being selectively movable along the longitudinal axis relative to the wall to adjust the predetermined torque, the clutch assembly including a first clutch member and a second clutch member, the first and second clutch members arranged to rotate together when torque imparted on the drive connector by the drive device is below the predetermined torque and arranged to rotate relative to one another when the torque imparted on the drive connector by the drive device exceeds the predetermined torque, wherein the first and clutch member, the second clutch member, and the torque adjuster are disposed in an operative arrangement in the interior, wherein the first clutch member and the interior are sized to permit installation of the first clutch member distally into the operative arrangement in the interior via the proximal opening, wherein the torque adjuster and the interior are sized to permit installation of the torque adjuster distally into the operative arrangement in the interior via the proximal opening, the torque adjuster being threadably engaged with the wall and disposed proximal of the first clutch member, the first clutch member being engaged with the second clutch member, the wall having an internal thread; and a plug closing the proximal opening of the interior, the plug being threadably engaged with the internal thread of the wall;

wherein the wall is arranged relative to the drive connector and the component driver such that the wall transmits rotation imparted on the drive connector by the drive device to drive rotation of the component driver to rotate the component when the torque imparted on the drive connector by the drive device is below the predetermined torque.

2. The torque driver of claim 1, wherein the first clutch member and the component driver are an integral, one-piece component.

3. The torque driver of claim 1, wherein the first clutch member has a first set of ratchet teeth and the second clutch member has a second set of ratchet teeth, the first and second sets of ratchet teeth engaged with one another, the first and second sets of ratchet teeth sized and shaped to move relative to one another when torque imparted on the drive connector by the drive device exceeds the predetermined torque.

4. The torque driver of claim 3, wherein the first clutch member is disposed proximal of the second clutch member, the first set of ratchet teeth facing distally and the second set of ratchet teeth facing proximally, the first and second sets of ratchet teeth each being arranged circumferentially about the longitudinal axis.

5. The torque driver of claim 4, wherein the second clutch member and the wall are separate pieces, the second clutch member being keyed with the wall so that the second clutch member and the wall rotate together about the longitudinal axis.

6. The torque driver of claim 1, wherein the clutch assembly includes a plurality of balls between the first and second clutch members, the first clutch member having a first set of recesses and the second clutch member having a second set of recesses, each recess of the first and second sets of recesses sized and shaped to receive a portion of one ball of the plurality of balls.

7. The torque driver of claim 1, wherein the second clutch member and the wall are arranged to rotate together.

8. The torque driver of claim 1, wherein the second clutch member and the wall are an integral, one-piece component.

9. The torque driver of claim 1, wherein the torque adjuster is disposed entirely within the interior.

10. The torque driver of claim 1, wherein the first clutch member, the second clutch member, and the wall are separate pieces, the second clutch member being keyed with the wall so that the second clutch member and the wall rotate together about the longitudinal axis.

11. The torque driver of claim 10, wherein the second clutch member includes a projection and the wall includes a recess, the projection mated with the recess to key the second clutch member with the wall.

12. The torque driver of claim 1, wherein the clutch assembly includes a coiled spring biasing the first and second clutch members into engagement with one another, the coiled spring being disposed in the interior.

13. The torque driver of claim 12, wherein the torque driver is free of an element disposed within the coiled spring.

14. The torque driver of claim 12, wherein the torque driver is free of an element extending through the coiled spring.

15. The torque driver of claim 1, wherein the torque adjuster includes a tool receiver configured to receive a tool to rotate the torque adjuster to move the torque adjuster along the longitudinal axis to change the predetermined torque.

16. The torque driver of claim 15, wherein the tool receiver comprises a hex opening passing through the torque adjuster.

17. The torque driver of claim 15, wherein the tool receiver of the torque adjuster is concealed from view.

18. The torque driver of claim 17, wherein the plug conceals the tool receiver of the torque adjuster from view.

19. The torque driver of claim 1, wherein the drive connector has a hexagon or square cross-sectional shape and the component driver comprises a socket sized and shaped to receive the component.

20. The torque driver of claim 19, wherein the socket has a hexagon cross-sectional shape.

21. The torque driver of claim 19, wherein the torque adjuster is configured to move toward the component driver to increase the predetermined torque.

22. The torque driver of claim 1, wherein the wall is arranged relative to the drive connector such that the wall transmits rotation imparted on the drive connector by the drive device when the torque imparted on the drive connector by the drive device exceeds the predetermined torque.

23. The torque driver of claim 1, further comprising a tapered nose connected to the distal end of the wall.

24. The torque driver of claim 1, wherein the wall has a cylindrical shape.

25. The torque driver of claim 1, wherein the internal thread of the wall is the one and only internal thread of the wall, the torque adjuster being threadably engaged with the internal thread.

26. The torque driver of claim 25, wherein the internal thread includes a first discontinuity and a second discontinuity.

27. The torque driver of claim 1, wherein the wall, the drive connector, the clutch assembly, and the component driver are arranged relative to one another such that, when the drive connector is rotated by the drive device and the torque imparted on the drive connector by the drive device is below the predetermined torque, the drive connector drives rotation of the wall, which in turn drives rotation of the clutch assembly, which in turn drives rotation of the component driver.

28. The torque driver of claim 1, wherein:

the first clutch member has a first set of ratchet teeth and the second clutch member has a second set of ratchet teeth, the first and second sets of ratchet teeth engaged with one another, the first and second sets of ratchet teeth sized and shaped to move relative to one another when torque imparted on the drive connector by the drive device exceeds the predetermined torque;

the first clutch member is disposed proximal of the second clutch member, the first set of ratchet teeth facing distally and the second set of ratchet teeth facing proximally, the first and second sets of ratchet teeth each being arranged circumferentially about the longitudinal axis;

the clutch assembly includes a coiled spring biasing the first and second clutch members into engagement with one another, the coiled spring being disposed in the interior;

the drive connector has a hexagon or square cross-sectional shape and the component driver comprises a socket sized and shaped to receive the component;

the tool receiver of the torque adjuster is concealed from view;

the torque adjuster is configured to move toward the component driver to increase the predetermined torque; and the wall has a cylindrical shape.

29. The torque driver of claim 28, wherein:

the first clutch member, the second clutch member, and the wall are separate pieces, the second clutch member being keyed with the wall so that the second clutch member and the wall rotate together about the longitudinal axis, the second clutch member including a projection and the wall including a recess, the projection mated with the recess to key the second clutch member with the wall;

each tooth of the first and second sets of ratchet teeth includes a ramp and a flat;

the wall and the plug conceal the torque adjuster from view;

the torque driver is free of an element disposed within the coiled spring; and the torque driver further comprises a tapered nose connected to the distal end of the wall.

30. The torque driver of claim 29, wherein:

the internal thread of the wall is the one and only internal thread of the wall, the torque adjuster being threadably engaged with the internal thread;

the internal thread includes a first discontinuity and a second discontinuity; and the drive connector comprises a shaft having a proximal end and a distal end, the distal end of the shaft being located closer to the distal end of the wall than the proximal end of the shaft, the distal end of the shaft being disposed proximally of the coiled spring.

31. The torque driver of claim 1, wherein the torque adjuster is concealed from view.

32. The torque driver of claim 31, wherein the wall and the plug conceal the torque adjuster from view.

33. The torque driver of claim 1, wherein the clutch assembly includes a biasing member biasing the first and second clutch members into engagement with one another, and wherein the drive connector comprises a shaft having a proximal end and a distal end, the distal end of the shaft being located closer to the distal end of the wall than the proximal end of the shaft, the distal end of the shaft being disposed proximally of the biasing member.

34. A torque driver for rotating a component, the torque driver comprising:

a wall having opposite proximal and distal ends and a longitudinal axis extending between the proximal and distal ends, the wall bordering an interior, the interior having a proximal opening, the wall bordering the proximal opening of the interior;

a drive connector configured to be engaged by a drive device, the drive connector being adjacent the proximal end of the wall;

a component driver configured to be operatively connected to the component to rotate the component, the component driver being adjacent the distal end of the wall; and a clutch assembly operatively connecting the drive connector and the component driver such that the drive connector rotates with the component driver when the drive connector is rotated by the drive device and torque imparted on the drive connector by the drive device is below the predetermined torque, the clutch assembly being arranged to permit the drive connector and the component driver to rotate relative to one another when torque imparted on the drive connector by the drive device exceeds the predetermined torque, the clutch assembly including a torque adjuster disposed in the interior, the torque adjuster being supported by the wall, and the torque adjuster being selectively movable along the longitudinal axis relative to the wall to adjust the predetermined torque, the clutch assembly including a first clutch member and a second clutch member, the first and second clutch members arranged to rotate together when torque imparted on the drive connector by the drive device is below the predetermined torque and arranged to rotate relative to one another when the torque imparted on the drive connector by the drive device exceeds the predetermined torque, wherein the first clutch member, the second clutch member, and the torque adjuster are disposed in an operative arrangement in the interior, wherein the first clutch member and the interior are sized to permit installation of the first clutch member distally into the operative arrangement in the interior via the proximal opening, wherein the torque adjuster and the interior are sized to permit installation of the torque adjuster distally into the operative arrangement in the interior via the proximal opening, the torque adjuster being threadably engaged with the wall and disposed proximal of the first clutch member, the first clutch member being engaged with the second clutch member, the clutch assembly including a coiled spring biasing the first and second clutch members into engagement with one another, the coiled spring being disposed in the interior;

wherein the wall is arranged relative to the drive connector and the component driver such that the wall transmits rotation imparted on the drive connector by the drive device to drive rotation of the component driver to rotate the component when the torque imparted on the drive connector by the drive device is below the predetermined torque;

wherein the torque driver is free of an element disposed within the coiled spring.

35. The torque driver of claim 34, wherein the first clutch member has a first set of ratchet teeth and the second clutch member has a second set of ratchet teeth, the first and second sets of ratchet teeth engaged with one another, the first and second sets of ratchet teeth sized and shaped to move relative to one another when torque imparted on the drive connector by the drive device exceeds the predetermined torque.

36. The torque driver of claim 35, wherein the first clutch member is disposed proximal of the second clutch member, the first set of ratchet teeth facing distally and the second set of ratchet teeth facing proximally, the first and second sets of ratchet teeth each being arranged circumferentially about the longitudinal axis.

37. The torque driver of claim 36, wherein the first clutch member, the second clutch member, and the wall are separate pieces, the second clutch member being keyed with the wall so that the second clutch member and the wall rotate together about the longitudinal axis.

38. The torque driver of claim 37, wherein the second clutch member includes a projection and the wall includes a recess, the projection mated with the recess to key the second clutch member with the wall.

39. The torque driver of claim 34, wherein the torque adjuster is disposed entirely within the interior.

40. The torque driver of claim 39, wherein the torque adjuster includes a tool receiver configured to receive a tool to rotate the torque adjuster to move the torque adjuster along the longitudinal axis to change the predetermined torque.

41. The torque driver of claim 40, wherein the tool receiver of the torque adjuster is concealed from view.

42. The torque driver of claim 41, further comprising a plug closing the proximal opening of the interior, the plug being threadably engaged with the wall, the plug concealing the tool receiver of the torque adjuster from view.

43. The torque driver of claim 34, wherein the drive connector has a hexagon or square cross-sectional shape and the component driver comprises a socket sized and shaped to receive the component.

44. The torque driver of claim 43, wherein the socket has a hexagon cross-sectional shape.

45. The torque driver of claim 44, wherein the torque adjuster is configured to move toward the component driver to increase the predetermined torque.

46. The torque driver of claim 34, further comprising a tapered nose connected to the distal end of the wall.

47. The torque driver of claim 34, wherein the wall has a cylindrical shape.

48. The torque driver of claim 34, wherein the wall includes one and only one internal thread, the torque adjuster being threadably engaged with the internal thread.

49. The torque driver of claim 48, wherein the internal thread includes a first discontinuity and a second discontinuity.

50. The torque driver of claim 34, wherein the torque adjuster is concealed from view.

51. The torque driver of claim 50, further comprising a plug closing the proximal opening of the interior, the plug being threadably engaged with the wall, the wall and the plug concealing the torque adjuster from view.

52. The torque driver of claim 34, wherein the drive connector comprises a shaft having a proximal end and a distal end, the distal end of the shaft being located closer to the distal end of the wall than the proximal end of the shaft, the distal end of the shaft being disposed proximally of the coiled spring.

53. The torque driver of claim 34, wherein:

the first clutch member has a first set of ratchet teeth and the second clutch member has a second set of ratchet teeth, the first and second sets of ratchet teeth engaged with one another, the first and second sets of ratchet teeth sized and shaped to move relative to one another when torque imparted on the drive connector by the drive device exceeds the predetermined torque;

the first clutch member is disposed proximal of the second clutch member, the first set of ratchet teeth facing distally and the second set of ratchet teeth facing proximally, the first and second sets of ratchet teeth each being arranged circumferentially about the longitudinal axis;

the drive connector has a hexagon or square cross-sectional shape and the component driver comprises a socket sized and shaped to receive the component;

the tool receiver of the torque adjuster is concealed from view;

the torque adjuster is configured to move toward the component driver to increase the predetermined torque; and the wall has a cylindrical shape.

54. The torque driver of claim 53, further comprising a plug closing the proximal opening of the interior, and wherein:

the first clutch member, the second clutch member, and the wall are separate pieces, the second clutch member being keyed with the wall so that the second clutch member and the wall rotate together about the longitudinal axis, the second clutch member including a projection and the wall including a recess, the projection mated with the recess to key the second clutch member with the wall;

each tooth of the first and second sets of ratchet teeth includes a ramp and a flat;

the plug being threadably engaged with the wall;

the wall and the plug concealing the torque adjuster from view; and the torque driver further comprises a tapered nose connected to the distal end of the wall.

55. The torque driver of claim 54, wherein:

the wall includes one and only one internal thread, the torque adjuster being threadably engaged with the internal thread;

the internal thread includes a first discontinuity and a second discontinuity; and the drive connector comprises a shaft having a proximal end and a distal end, the distal end of the shaft being located closer to the distal end of the wall than the proximal end of the shaft, the distal end of the shaft being disposed proximally of the coiled spring.

56. A torque driver for rotating a component, the torque driver comprising:

a wall having opposite proximal and distal ends and a longitudinal axis extending between the proximal and distal ends, the wall bordering an interior, the interior having a proximal opening, the wall bordering the proximal opening of the interior;

a drive connector configured to be engaged by a drive device, the drive connector being adjacent the proximal end of the wall;

a component driver configured to be operatively connected to the component to rotate the component, the component driver being adjacent the distal end of the wall; and a clutch assembly operatively connecting the drive connector and the component driver such that the drive connector rotates with the component driver when the drive connector is rotated by the drive device and torque imparted on the drive connector by the drive device is below the predetermined torque, the clutch assembly being arranged to permit the drive connector and the component driver to rotate relative to one another when torque imparted on the drive connector by the drive device exceeds the predetermined torque, the clutch assembly including a torque adjuster disposed in the interior, the torque adjuster being supported by the wall, and the torque adjuster being selectively movable along the longitudinal axis relative to the wall to adjust the predetermined torque, the clutch assembly including a first clutch member and a second clutch member, the first and second clutch members arranged to rotate together when torque imparted on the drive connector by the drive device is below the predetermined torque and arranged to rotate relative to one another when the torque imparted on the drive connector by the drive device exceeds the predetermined torque, wherein the first clutch member, the second clutch member, and the torque adjuster are disposed in an operative arrangement in the interior, wherein the first clutch member and the interior are sized to permit installation of the first clutch member distally into the operative arrangement in the interior via the proximal opening, wherein the torque adjuster and the interior are sized to permit installation of the torque adjuster distally into the operative arrangement in the interior via the proximal opening, the torque adjuster being threadably engaged with the wall and disposed proximal of the first clutch member, the first clutch member being engaged with the second clutch member, the clutch assembly including a coiled spring biasing the first and second clutch members into engagement with one another, the coiled spring being disposed in the interior;

wherein the wall is arranged relative to the drive connector and the component driver such that the wall transmits rotation imparted on the drive connector by the drive device to drive rotation of the component driver to rotate the component when the torque imparted on the drive connector by the drive device is below the predetermined torque;

wherein the torque driver is free of an element extending through the coiled spring.

57. The torque driver of claim 56, wherein the first clutch member has a first set of ratchet teeth and the second clutch member has a second set of ratchet teeth, the first and second sets of ratchet teeth engaged with one another, the first and second sets of ratchet teeth sized and shaped to move relative to one another when torque imparted on the drive connector by the drive device exceeds the predetermined torque.

58. The torque driver of claim 57, wherein the first clutch member is disposed proximal of the second clutch member, the first set of ratchet teeth facing distally and the second set of ratchet teeth facing proximally, the first and second sets of ratchet teeth each being arranged circumferentially about the longitudinal axis.

59. The torque driver of claim 58, wherein the first clutch member, the second clutch member, and the wall are separate pieces, the second clutch member being keyed with the wall so that the second clutch member and the wall rotate together about the longitudinal axis.

60. The torque driver of claim 59, wherein the second clutch member includes a projection and the wall includes a recess, the projection mated with the recess to key the second clutch member with the wall.

61. The torque driver of claim 60, wherein the torque adjuster is disposed entirely within the interior.

62. The torque driver of claim 61, wherein the torque adjuster includes a tool receiver configured to receive a tool to rotate the torque adjuster to move the torque adjuster along the longitudinal axis to change the predetermined torque.

63. The torque driver of claim 62, wherein the tool receiver of the torque adjuster is concealed from view.

64. The torque driver of claim 63, wherein the torque adjuster is concealed from view.

65. The torque driver of claim 64, further comprising a plug closing the proximal opening of the interior, the plug being threadably engaged with the wall, the wall and the plug concealing the torque adjuster from view.

66. The torque driver of claim 65, wherein the drive connector has a hexagon or square cross-sectional shape and the component driver comprises a socket sized and shaped to receive the component, the socket having a hexagon cross-sectional shape.

67. The torque driver of claim 66, wherein the torque adjuster is configured to move toward the component driver to increase the predetermined torque.

68. The torque driver of claim 67, further comprising a tapered nose connected to the distal end of the wall.

69. The torque driver of claim 68, wherein the wall has a cylindrical shape.

70. The torque driver of claim 69, wherein the wall includes one and only one internal thread, the torque adjuster and the plug being threadably engaged with the internal thread.

71. The torque driver of claim 70, wherein the internal thread includes a first discontinuity and a second discontinuity.

72. The torque driver of claim 71, wherein the drive connector comprises a shaft having a proximal end and a distal end, the distal end of the shaft being located closer to the distal end of the wall than the proximal end of the shaft, the distal end of the shaft being disposed proximally of the coiled spring.

* * * * *